(12) United States Patent
Kim et al.

(10) Patent No.: US 11,860,341 B2
(45) Date of Patent: Jan. 2, 2024

(54) COVER WINDOW AND DISPLAY DEVICE INCLUDING THE SAME

(71) Applicant: Samsung Display Co., LTD., Yongin-si (KR)

(72) Inventors: Sang Hoon Kim, Hwaseong-si (KR); Seong Jin Hwang, Suwon-si (KR); Min Sang Koo, Seongnam-si (KR); Kyung-Man Kim, Anyang-si (KR); Min-Hoon Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 272 days.

(21) Appl. No.: 17/139,385

(22) Filed: Dec. 31, 2020

(65) Prior Publication Data
US 2021/0293997 A1      Sep. 23, 2021

(30) Foreign Application Priority Data

Mar. 19, 2020   (KR) .................. 10-2020-0033962

(51) Int. Cl.
   *B32B 3/10*      (2006.01)
   *G02B 1/14*     (2015.01)
   *G02B 1/04*      (2006.01)
   *G02B 1/00*      (2006.01)

(52) U.S. Cl.
   CPC .............. *G02B 1/14* (2015.01); *G02B 1/002* (2013.01); *G02B 1/04* (2013.01)

(58) Field of Classification Search
   None
   See application file for complete search history.

(56) References Cited

U.S. PATENT DOCUMENTS

| 9,865,844 B1 | 1/2018 | Park et al. |
| 2014/0106146 A1* | 4/2014 | Decker .................. C03C 17/34 428/210 |
| 2018/0375043 A1 | 12/2018 | Jung et al. |
| 2020/0105169 A1 | 4/2020 | Jeong et al. |

FOREIGN PATENT DOCUMENTS

| JP | 2014180847 | 9/2014 |
| KR | 100489727 | 5/2005 |
| KR | 1020130084102 | 7/2013 |
| KR | 1020170026747 | 3/2017 |

* cited by examiner

*Primary Examiner* — Christopher M Polley
(74) *Attorney, Agent, or Firm* — CANTOR COLBURN LLP

(57) ABSTRACT

A cover window includes a glass substrates, a first coating layer disposed on a first surface of the glass substrate, and a second coating layer disposed on the first coating layer, where a thickness of the glass substrate is equal to or less than about 100 micrometers (μm), and a thickness of each of the first coating layer and the second coating layer ranges from about 50 angstroms (Å) to about 400 Å.

18 Claims, 23 Drawing Sheets

COVER WINDOW AND DISPLAY DEVICE INCLUDING THE SAME

This application claims priority to Korean Patent Application No. 10-2020-0033962 filed on Mar. 19, 2020, and all the benefits accruing therefrom under 35 U.S.C. § 119, the content of which in its entirety is herein incorporated by reference.

BACKGROUND

(a) Field

Embodiments of the invention relate to a cover window and a display device including the same.

(b) Description of the Related Art

Recently, various mobile electronic devices, such as a portable phone, a navigation device, a digital camera, an electronic book, a portable game console, or various kinds of terminals to which a liquid crystal display or an organic light emitting diode display is applied as a display device, have been used.

Generally, the display device includes a display panel, and a cover window that is transparently formed so that a user may see a display part is provided at a front side of the display panel. Since the cover window is disposed at the outermost side of the display device, the cover window should be substantially strong against an external impact so as to protect the display panel and the like inside the display device.

In addition, recently, research on a flexible display device is being actively conducted, and it is preferable that a cover window applied to the flexible display device has foldable flexibility.

SUMMARY

Embodiments have been made in an effort to provide a cover window that is foldable and has enhanced impact resistance, and a display device including the same.

An embodiment of the invention provides a cover window including a glass substrate, a first coating layer disposed on a first surface of the glass substrate, and a second coating layer disposed on the first coating layer, where a thickness of the glass substrate may be equal to or less than 100 micrometers (μm), and a thickness of each of the first coating layer and the second coating layer may range from 50 angstroms (Å) to 400 Å.

In an embodiment, the first coating layer and the second coating layer may respectively include materials different from each other.

In an embodiment, each of the first coating layer and the second coating layer may include at least one of a polyimine oligomer having an average molecular weight of 300 grams per mole (g/mol) to 5000 g/mol, an epoxy oligomer having an average molecular weight ranging from 300 g/mol to 5000 g/mol, an epoxy silane, an amino silane, a sodium silicate, and a polyvinyl alcohol ("PVA").

In an embodiment, the cover window may further include an inorganic film disposed between the first coating layer and the second coating layer.

In an embodiment, the first coating layer may include a sodium silicate, and the second coating layer may include a polyimine oligomer having an average molecular weight ranging from 300 g/mol to 5000 g/mol.

In an embodiment, the first coating layer may include an epoxy silane, and the second coating layer may include a PVA.

In an embodiment, the cover window may further include a first upper layer disposed on a second surface of the glass substrate.

In an embodiment, the cover window may further include a second upper layer disposed on the first upper layer, where the first upper layer may be disposed between the glass substrate and the second upper layer.

In an embodiment, the cover window may further include a third upper layer disposed on the second upper layer, or a third upper layer disposed on the second upper layer and a fourth upper layer disposed on the third upper layer.

In an embodiment, the cover window may further include a third coating layer disposed in contact with the second coating layer.

In an embodiment, the first to third coating layers may respectively include materials different from one another, and each of the first to third coating layers may include at least one of a polyimine oligomer having an average molecular weight ranging from 300 g/mol to 5000 g/mol, an epoxy oligomer having an average molecular weight ranging from 300 g/mol to 5000 g/mol, an epoxy silane, an amino silane, a sodium silicate, and a PVA.

In an embodiment, the first coating layer may include an epoxy silane, the second coating layer includes a PVA, and the third coating layer includes a sodium silicate.

In an embodiment, the cover window may further include a first upper layer disposed on a second surface of the glass substrate.

In an embodiment, the cover window may further include a second upper layer disposed on the first upper layer, where the first upper layer may be disposed between the glass substrate and the second upper layer.

In an embodiment, the cover window may further include a third upper layer disposed on the second upper layer, or a third upper layer disposed on the second upper layer and a fourth upper layer disposed on the third upper layer.

In an embodiment, the cover window may further include a fourth coating layer disposed in contact with the third coating layer.

In an embodiment, the first to fourth coating layers may respectively include materials different from one another, and each of the first to fourth coating layers may include at least one of a polyimine oligomer having an average molecular weight ranging from 300 g/mol to 5000 g/mol, an epoxy oligomer having an average molecular weight ranging from 300 g/mol to 5000 g/mol, an epoxy silane, an amino silane, a sodium silicate, and a PVA.

In an embodiment, the first coating layer may include an epoxy silane, the second coating layer may include a PVA, the third coating layer may include a sodium silicate, and the fourth coating layer may include a polyimine oligomer having an average molecular weight ranging from 300 g/mol to 5000 g/mol.

In an embodiment, the cover window may further include an upper layer disposed on a second surface of the glass substrate.

Another embodiment of the invention provides a display device including the cover window, and a display panel overlapping the cover window.

According to the embodiments, it is possible to provide a cover window that is foldable and has enhanced impact resistance, and a display device including the same.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
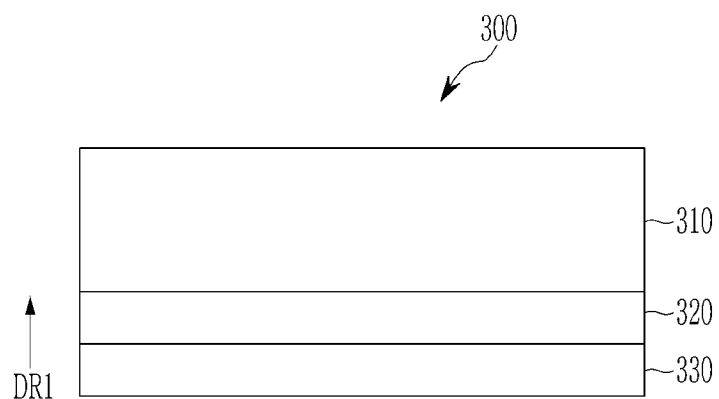
FIG. 1 illustrates a cross-sectional view of an embodiment of a cover window.

Embodiments of the invention will be described more fully hereinafter with reference to the accompanying drawings, in which embodiments of the invention are shown. As those skilled in the art would realize, the described embodiments may be modified in various different ways, all without departing from the spirit or scope of the disclosure.

Parts that are irrelevant to the description will be omitted to clearly describe the disclosure, and like reference numerals designate like elements throughout the specification.

Further, in the drawings, the size and thickness of each element are arbitrarily illustrated for ease of description, and the disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Further, throughout the specification, the phrase "in a plan view" means viewing a target portion from the top, and the phrase "in a cross-section" means viewing a cross-section defined by vertically cutting a target portion from the side.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of a cover window and a display device including the same according to the invention will be described in detail with reference to the accompanying drawings.

FIG. 1 illustrates a cross-sectional view of a cover window. A cover window 300 in an embodiment may include a glass substrate 310, a first coating layer 320, and a second coating layer 330.

Although not illustrated, when the cover window 300 is applied to a display device, a display panel (not shown) may be disposed at an upper portion of the second coating layer 330. That is, in the specification, upper and lower portions are distinguished based on a first direction DR1 illustrated in FIG. 1. In other words, a direction indicated by an arrow of the first direction DR1 is upward, and an opposite direction thereof is downward. In the cover window 300, the glass substrate 310 may be disposed at the uppermost position, and the second coating layer 330 may be disposed at the lowermost position.

The glass substrate 310 includes glass, and may be thin and bendable. In an embodiment, a thickness of the glass substrate 310 may be equal to or less than 100 micrometers (μm), for example. A typical glass substrate having a thickness of several hundreds of microns is not easily bent, but the glass substrate 310 in the illustrated embodiment has a thickness equal to or less than 100 μm, for example, and thus may be easily bent.

The bendable glass substrate 310 has similar bending performance to that of a polymer substrate, and has excellent transmissive properties compared to the polymer substrate. In addition, it may have excellent display quality in a curved display device, since deterioration of an appearance level according to an external environment is lower than that of the polymer substrate.

The first coating layer 320 and the second coating layer 330 are disposed on one side of the glass substrate 310. The first coating layer 320 and the second coating layer 330 may increase impact resistance so that the thin glass substrate 310 is not damaged by an external impact.

Figure 2:
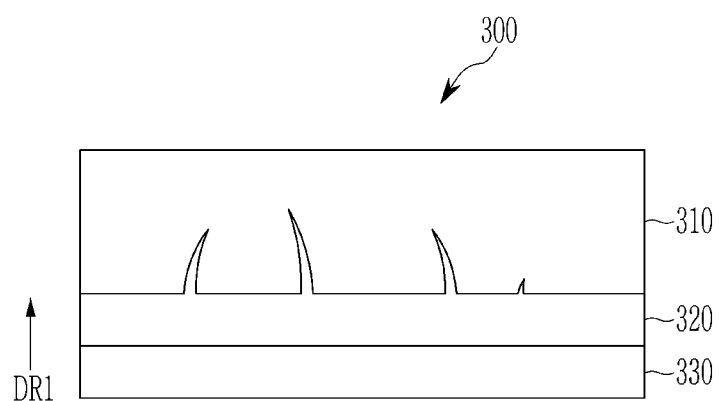
FIG. 2 illustrates a principle of enhancing impact resistance of a cover window including a glass substrate with thin first and second coating layers.

FIG. 2 illustrates a principle of enhancing impact resistance of the cover window 300 including the glass substrate 310 provided with the thin first and second coating layers 320 and 330. Referring to FIG. 2, the first coating layer 320 fills minute cracks defined in the glass substrate 310. The minute cracks defined in the glass substrate 310 may be points at which cracks start when an impact is applied to the cover window 300. However, when the first coating layer 320 fills these minute cracks, even though an impact is applied to the cover window 300, the crack does not easily progress, and thus the impact resistance of the cover window 300 may be enhanced.

In addition, the second coating layer 330 disposed on the first coating layer 320 may include a different material from that of the first coating layer 320 to increase impact resistance of the cover window 300 in a different manner from the first coating layer 320. As an example, the second coating layer 330 may include a material that is more resistant to moisture than that of the first coating layer 320. In an alternative embodiment, the second coating layer 330 may include a material having higher stress resistance than that of the first coating layer 320. As such, when the second coating layer 330 includes the material having the higher stress resistance than that of the first coating layer 320, the second coating layer 330 may fix the first coating layer 320 with high stress resistance, and thus, even though an impact is applied to the cover window 300, it may prevent the cover window 300 from being easily damaged.

Materials of the first coating layer 320 and the second coating layer 330 may vary. In an embodiment, the first coating layer 320 may include one or more of a polyimine oligomer, an epoxy oligomer, an epoxy silane, an amino silane, a sodium silicate, and a polyvinyl alcohol ("PVA"), for example.

In the illustrated embodiment, the polyimine oligomer means a material of which a carbon chain includes two or more imine groups. In an embodiment, an average molecular weight of the polyimine oligomer of the illustrated embodiment may be about 300 g/mol to about 5000 g/mol, for example.

An oligomer having an average molecular weight of less than about 300 g/mol has a form of a single molecule, thus it does not have sufficient elasticity. Therefore, when the oligomer is applied to the first coating layer 320 or the second coating layer 330, the first coating layer 320 or the second coating layer 330 may not have sufficient impact resistance. In addition, when an oligomer having an average molecular weight greater than about 5000 g/mol is used, it is not preferable because it is not manufactured by a thermal evaporation method due to its excessively large molecular weight. That is, when a polymer having an average molecular weight greater than about 5000 g/mol is used, carbonization may occur before evaporation in a manufacturing process using the thermal evaporation method. In some embodiments, an average molecular weight of the polyimine oligomer may be about 300 g/mol to about 5000 g/mol, for example. This range is one in which the oligomer may have sufficient elasticity and a coating layer may be easily provided during manufacturing.

In the illustrated embodiment, the epoxy oligomer means a material of which a carbon chain includes one or more epoxy groups. In an embodiment, an average molecular weight of the epoxy oligomer of the illustrated embodiment may range from about 300 g/mol to about 5000 g/mol, for example. This range is one in which the epoxy oligomer may have sufficient elasticity and a coating layer may be easily formed during manufacturing.

In the illustrated embodiment, the epoxy silane is a material including both an epoxy group and a silane group. In the illustrated embodiment, the epoxy silane may include two or more epoxy groups.

In the illustrated embodiment, the amino silane is a material including an amino group and a silane group. In the illustrated embodiment, the amino silane may include one or more amino groups.

In an embodiment, a thickness of each of the first coating layer 320 and the second coating layer 330 may range from about 50 angstroms (Å) to about 400 Å, for example. When the thickness of each of the first coating layer 320 and the second coating layer 330 is less than 50 Å, it may not have a sufficient impact absorbing effect. In addition, when the thickness of each of the first coating layer 320 and the second coating layer 330 is greater than 400 Å, since an overall thickness of the cover window 300 increases, bending characteristics may be reduced.

Figure 3:
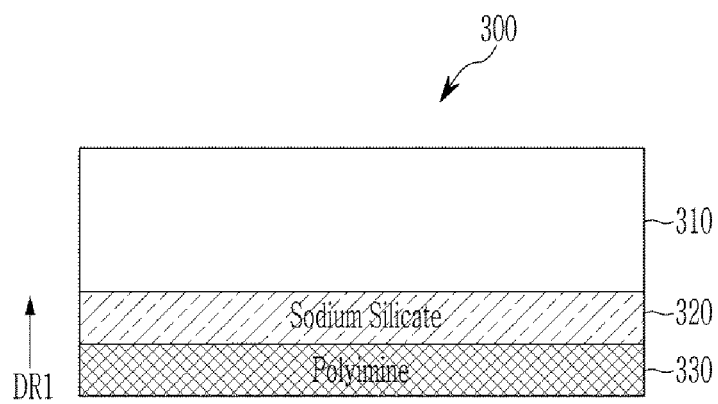
FIG. 3 illustrates an embodiment of a cover window.

The first coating layer 320 and the second coating layer 330 may respectively include materials different from each other. FIG. 3 illustrates an embodiment of a cover window. Referring to FIG. 3, the first coating layer 320 may include a sodium silicate, and the second coating layer 330 may include a polyimine oligomer. In this case, the first coating layer 320 may fill a crack of the glass substrate 310 to increase impact resistance. In addition, since the sodium silicate has water resistance, it is possible to increase water resistance of the cover window 300. Since the polyimine oligomer of the second coating layer 330 has high stress resistance, it may fix the first coating layer 320 and the glass substrate 310, and even if an impact is applied to the cover window 300, the impact may be prevented from being transmitted.

Figure 4:
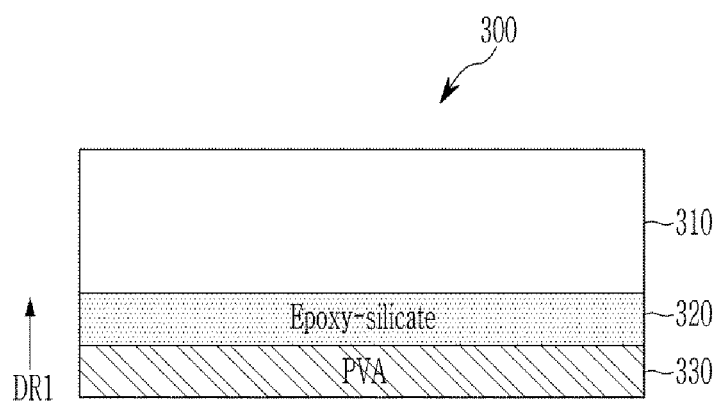
FIG. 4 illustrates a cross-sectional view of another embodiment that illustrates the same cross-section as in FIG. 3.

FIG. 4 illustrates a cross-sectional view of another embodiment that illustrates the same cross-section as in FIG. 3. Referring to FIG. 3, the first coating layer 320 may include an epoxy silane, and the second coating layer 330 may include a PVA. In this case, the epoxy silane of the first coating layer 320 fills a crack of the glass substrate 310, and the epoxy silane has high stress resistance, so that the glass substrate 310 may be fixed. Therefore, even though an impact is applied to the glass substrate 310, it is possible to prevent such an impact from being transmitted. In addition, the PVA of the second coating layer 330 has high elasticity, thus it may absorb an impact and increase flexibility of the cover window 300.

FIGS. 1, 3, and 4 illustrate the coating layer having a double-layered structure, but the coating layer may have a structure of three or more layers.

Figure 5:
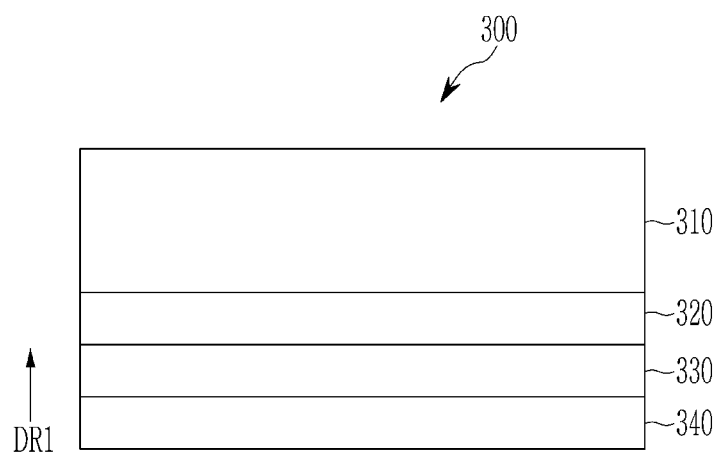
FIG. 5 illustrates the same cross-sectional view as FIG. 1 in another embodiment of a display device.

FIG. 5 illustrates the same cross-sectional view as FIG. 1 in another embodiment of a display device. Referring to FIG. 5, the display device in the illustrated embodiment is the same as the embodiment of FIG. 1, except that a third coating layer 340 is further disposed under the second coating layer 330. Descriptions of the first coating layer 320 and the second coating layer 330 are the same as those described above, so they are omitted.

The third coating layer 340 may include different materials from those of the first coating layer 320 and the second coating layer 330. In an embodiment, a thickness of the third coating layer 340 may range from about 50 Å to about 400 Å, for example. When the thickness of the third coating layer 340 is less than 50 Å, it may not have a sufficient impact absorbing effect. In addition, when the thickness of the third coating layer 340 is greater than 400 Å, since an overall thickness of the cover window 300 increases, bending characteristics may be reduced.

In an embodiment, the third coating layer 340 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. A detailed description of each material is the same as that described above, so it is omitted.

Figure 6:
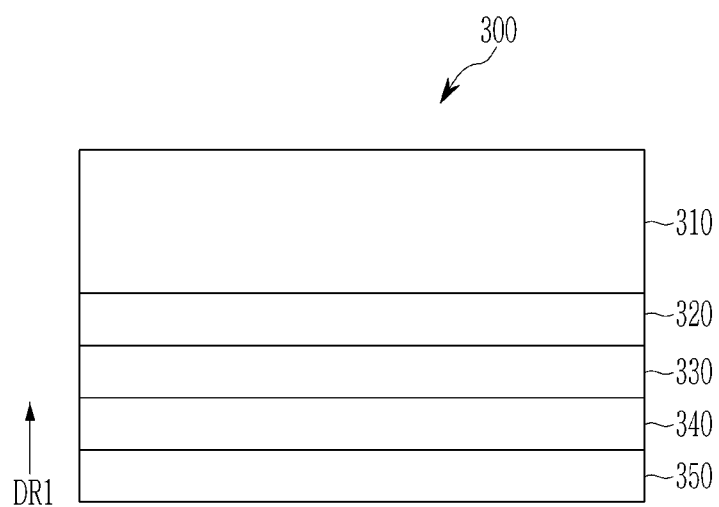
FIG. 6 illustrates the same cross-sectional view as FIG. 5 in another embodiment of a display device.

FIG. 6 illustrates the same cross-sectional view as FIG. 5 in another embodiment of a display device. Referring to FIG. 6, the display device in the illustrated embodiment is the same as the embodiment of FIG. 5, except that a fourth coating layer 350 is further disposed under the third coating layer 340. Descriptions of the first coating layer 320, the second coating layer 330, and the third coating layer 340 are the same as those described above, so they are omitted.

The fourth coating layer 350 may include different materials from those of the first coating layer 320, the second coating layer 330, and the third coating layer 340. In an embodiment, a thickness of the fourth coating layer 350 may range from about 50 Å to about 400 Å, for example. When the thickness of the fourth coating layer 350 is less than 50 Å, it may not have a sufficient impact absorbing effect. In addition, when the thickness of the fourth coating layer 350 is greater than 400 Å, since an overall thickness of the cover window 300 increases, bending characteristics may be reduced.

In an embodiment, the fourth coating layer 350 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. A detailed description of each material is the same as that described above, so it will be omitted.

In the previous embodiment, the first coating layer 320 to the fourth coating layer 350 may include an organic material. However, a structure in which an inorganic layer is included between respective coating layers is also included in the embodiment of the invention.

Figure 7:
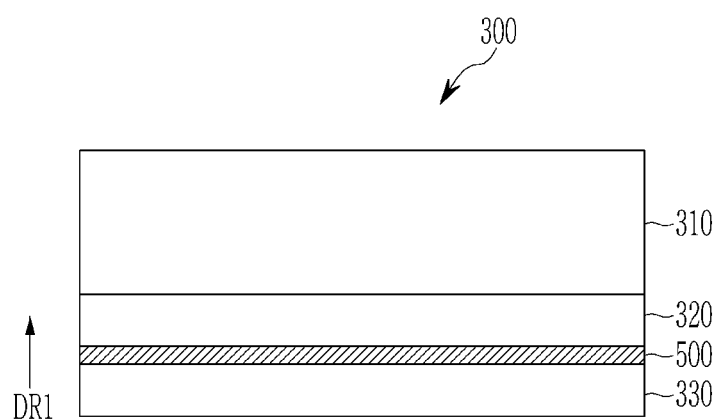
FIG. 7 illustrates the same cross-sectional view as FIG. 1 in another embodiment of a cover window 300.

FIG. 7 illustrates the same cross-sectional view as FIG. 1 in another embodiment of a cover window 300. Referring to FIG. 7, the cover window 300 in the illustrated embodiment is the same as the embodiment of FIG. 1, except that an inorganic layer 500 is included between the first coating layer 320 and the second coating layer 330. A detailed description of the same constituent elements will be omitted.

The inorganic layer 500 may include a silicon nitride or a silicon oxide. When the inorganic layer 500 is included as described above, even if an impact is applied to the cover window 300, the inorganic layer 500 supports it, so that impact resistance may be increased. Particularly, in the structure in which the inorganic layer 500 is disposed between the first coating layer 320 and the second coating layer 330, which are organic layers, as in the illustrated embodiment, the inorganic layer 500 may absorb the impact by increasing overall strength while preventing the cover window 300 from being broken.

Figure 8:
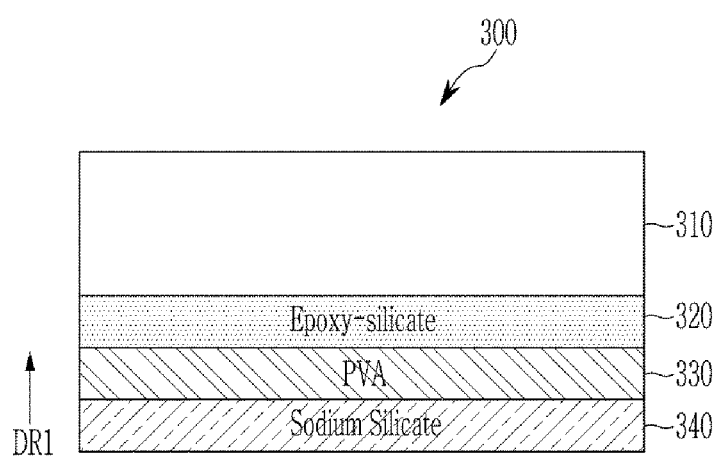
FIG. 8 illustrates a cross-sectional view of another embodiment that illustrates the same cross-section as in FIG. 5.

FIG. 8 illustrates a cross-sectional view of another embodiment that illustrates the same cross-section as in FIG. 5. Referring to FIG. 8, the first coating layer 320 may include an epoxy silane, the second coating layer 330 may include a PVA, and the third coating layer 340 may include a sodium silicate.

In this case, the epoxy silane of the first coating layer 320 fills minute cracks of the glass substrate 310, and the epoxy silane has high stress resistance, so that the glass substrate 310 may be fixed. Therefore, even if an impact is applied to the glass substrate 310, it is possible to prevent such an impact from being transmitted. In addition, the PVA of the second coating layer 330 has high elasticity, thus it may absorb an impact and increase flexibility of the cover window 300. In addition, since the sodium silicate of the third coating layer 340 has water resistance, it is possible to increase water resistance of the cover window 300.

Figure 9:
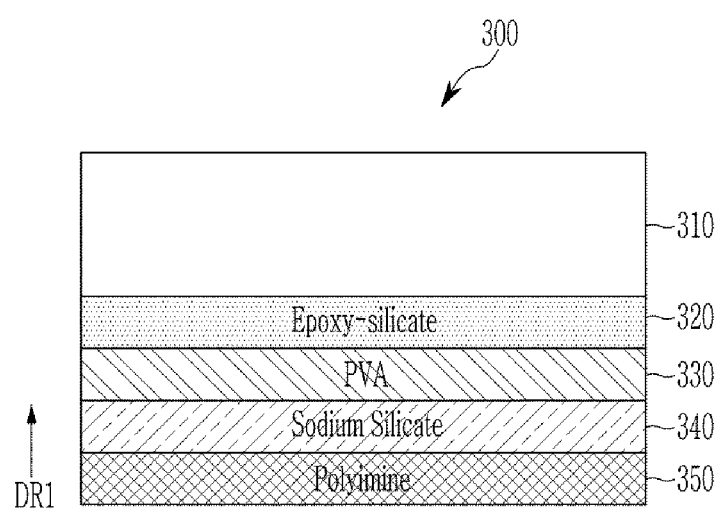
FIG. 9 illustrates a cross-sectional view of another embodiment that illustrates the same cross-section as in FIG. 8.

FIG. 9 illustrates a cross-sectional view of another embodiment that illustrates the same cross-section as in FIG. 8. Referring to FIG. 9, the cover window in the illustrated embodiment is the same as the embodiment of FIG. 8, except that the fourth coating layer 350 is further included. A detailed description of the same constituent elements will be omitted.

The fourth coating layer 350 may include a polyimine oligomer. Since the polyimine oligomer of the fourth coating layer 350 has high stress resistance, it may fix the cover window 300, and even if an impact is applied to the cover window 300, the impact is prevented from being transmitted.

Figure 10:
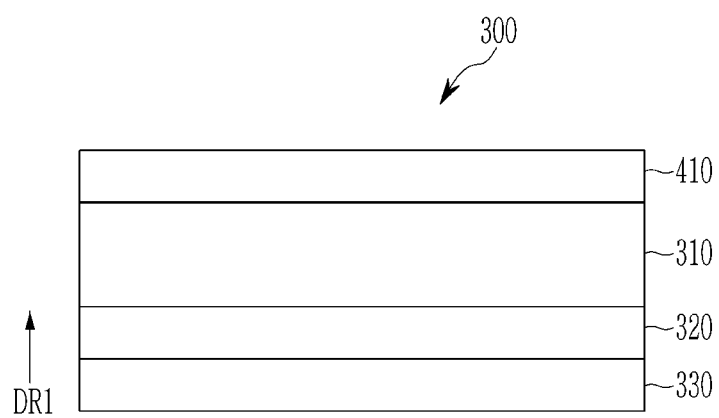
FIG. 10 illustrates a cross-sectional view of another embodiment that illustrates the same cross-section as in FIG. 1.

FIG. 10 illustrates a cross-sectional view of another embodiment that illustrates the same cross-section as in FIG. 1. Referring to FIG. 10, the cover window in the illustrated embodiment is the same as the embodiment of FIG. 1, except that a first upper layer 410 disposed on an upper surface of the glass substrate 310 is further included. A detailed description of the same constituent elements will be omitted.

In an embodiment, the first upper layer 410 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the first upper layer 410 may be about 50 Å to about 400 Å, for example.

Figure 11:
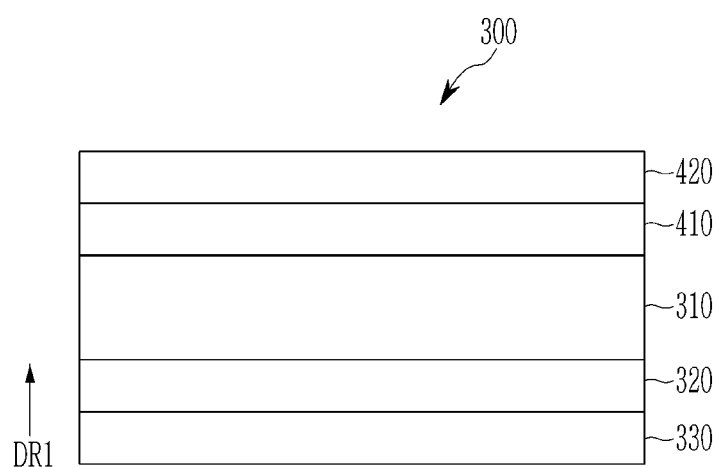
FIG. 11 illustrates a cross-sectional view of another embodiment that illustrates the same cross-section as in FIG. 10.

FIG. 11 illustrates a cross-sectional view of another embodiment that illustrates the same cross-section as in FIG. 10. Referring to FIG. 11, the display device in the illustrated embodiment is the same as the embodiment of FIG. 10, except that a second upper layer 420 disposed on the first upper layer 410 is further included. A detailed description of the same constituent elements will be omitted. In an embodiment, the second upper layer 420 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the second upper layer 420 may be about 50 Å to about 400 Å, for example.

Figure 12:
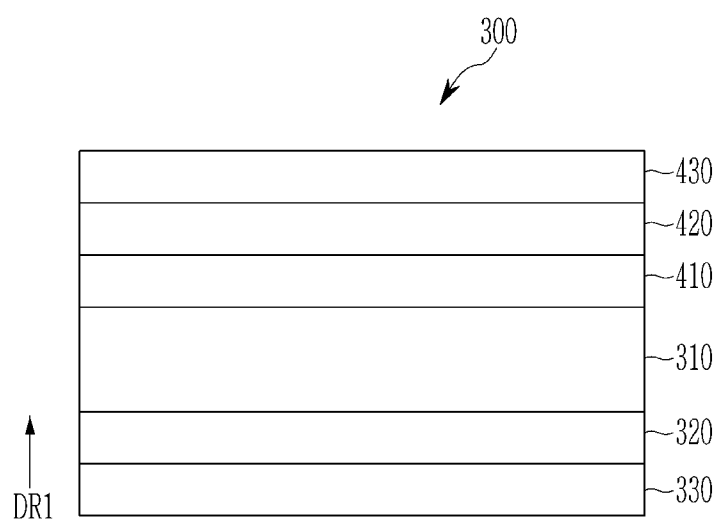
FIG. 12 illustrates a cross-sectional view of another embodiment that illustrates the same cross-section as in FIG. 11.

FIG. 12 illustrates a cross-sectional view of another embodiment that illustrates the same cross-section as in FIG. 11. Referring to FIG. 12, the display device in the illustrated embodiment is the same as the embodiment of FIG. 11, except that a third upper layer 430 disposed on the second upper layer 420 is further included. A detailed description of the same constituent elements will be omitted. In an embodiment, the third upper layer 430 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the third upper layer 430 may be about 50 Å to about 400 Å, for example.

Figure 13:
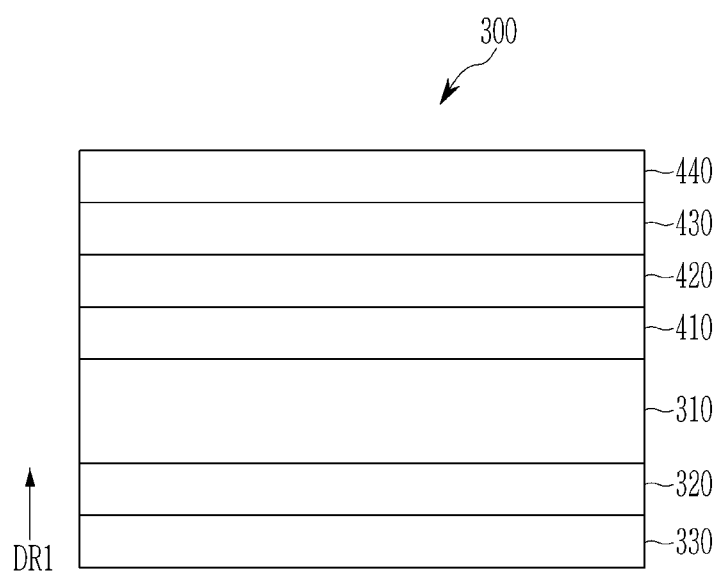
FIG. 13 illustrates a cross-sectional view of another embodiment that illustrates the same cross-section as in FIG. 12.

FIG. 13 illustrates a cross-sectional view of another embodiment that illustrates the same cross-section as in FIG. 12. Referring to FIG. 13, the display device in the illustrated embodiment is the same as the embodiment of FIG. 12, except that a fourth upper layer 440 disposed on the third upper layer 430 is further included. A detailed description of the same constituent elements will be omitted. In an embodiment, the fourth upper layer 440 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the fourth upper layer 440 may be about 50 Å to about 400 Å, for example.

Figure 14:
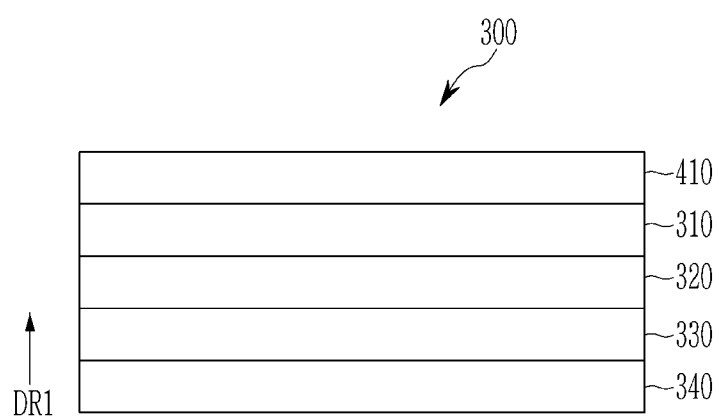
FIG. 14 illustrates a cross-sectional view of another embodiment that illustrates the same cross-section as in FIG. 5.

FIG. 14 illustrates a cross-sectional view of another embodiment that illustrates the same cross-section as in FIG. 5. Referring to FIG. 14, the cover window in the illustrated embodiment is the same as the embodiment of FIG. 5, except that the first upper layer 410 disposed on an upper surface of the glass substrate 310 is further included. A detailed description of the same constituent elements will be omitted. In an embodiment, the first upper layer 410 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the first upper layer 410 may be about 50 Å to about 400 Å, for example.

Figure 15:
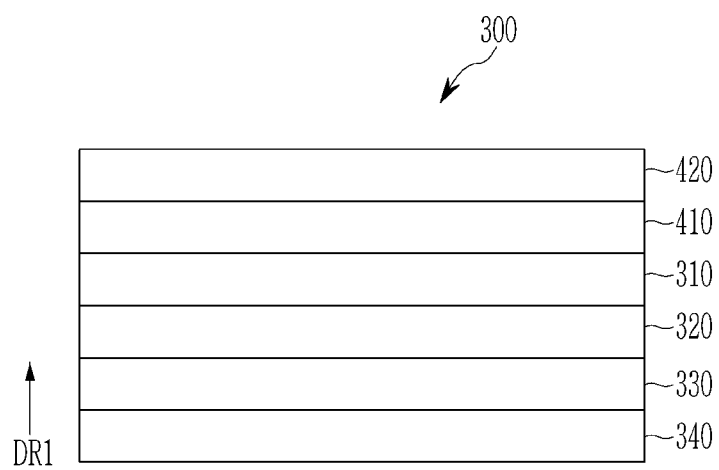
FIG. 15 illustrates a cross-sectional view of another embodiment that illustrates the same cross-section as in FIG. 14.

FIG. 15 illustrates a cross-sectional view of another embodiment that illustrates the same cross-section as in FIG. 14. Referring to FIG. 15, the display device in the illustrated embodiment is the same as the embodiment of FIG. 14, except that the second upper layer 420 disposed on the first upper layer 410 is further included. A detailed description of the same constituent elements will be omitted. In an embodiment, the second upper layer 420 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the second upper layer 420 may be about 50 Å to about 400 Å, for example.

Figure 16:
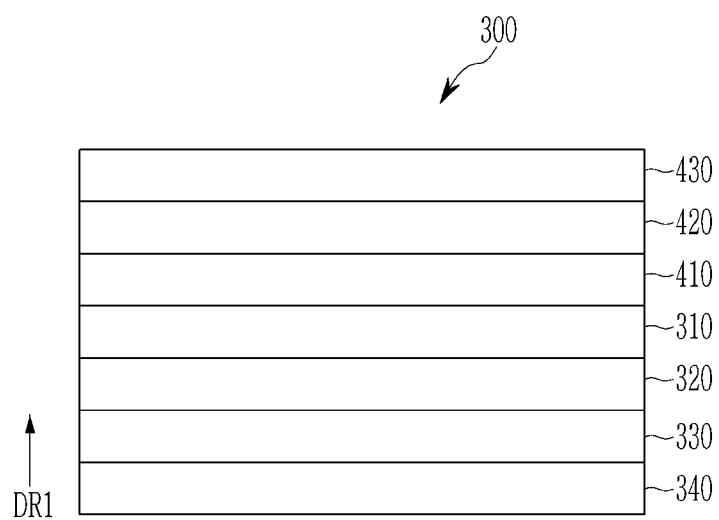
FIG. 16 illustrates a cross-sectional view of another embodiment that illustrates the same cross-section as in FIG. 15.

FIG. 16 illustrates a cross-sectional view of another embodiment that illustrates the same cross-section as in FIG. 15. Referring to FIG. 16, the display device in the illustrated embodiment is the same as the embodiment of FIG. 15, except that the third upper layer 430 disposed on the second upper layer 420 is further included. A detailed description of the same constituent elements will be omitted. In an embodiment, the third upper layer 430 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example.

In an embodiment, a thickness of the third upper layer 430 may be about 50 Å to about 400 Å, for example.

Figure 17:
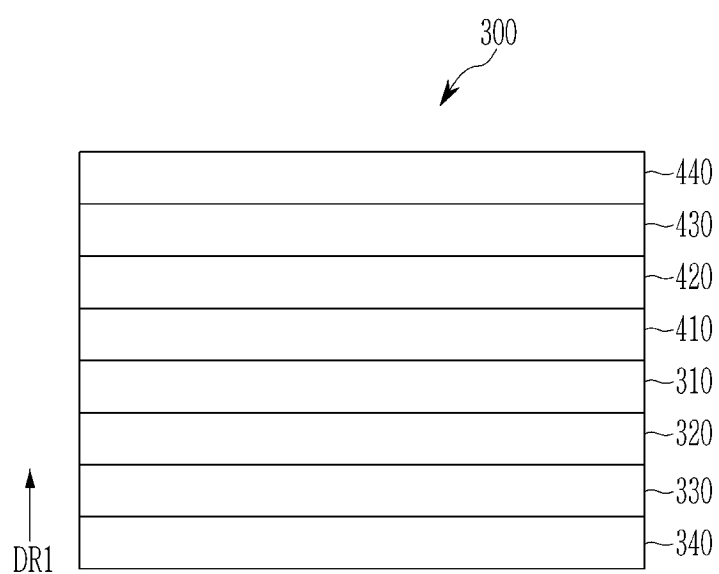
FIG. 17 illustrates a cross-sectional view of another embodiment that illustrates the same cross-section as in FIG. 16.

FIG. 17 illustrates a cross-sectional view of another embodiment that illustrates the same cross-section as in FIG. 16. Referring to FIG. 17, the display device in the illustrated embodiment is the same as the embodiment of FIG. 16, except that the fourth upper layer 440 disposed on the third upper layer 430 is further included. A detailed description of the same constituent elements will be omitted. In an embodiment, the fourth upper layer 440 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the fourth upper layer 440 may be about 50 Å to about 400 Å, for example.

Figure 18:
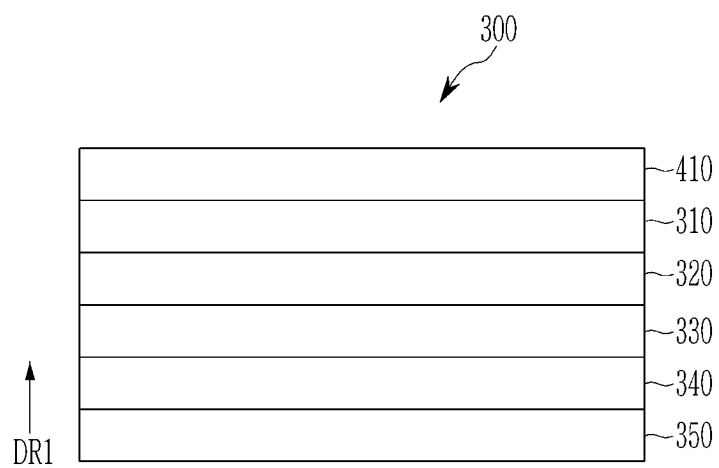
FIG. 18 illustrates a cross-sectional view of another embodiment that illustrates the same cross-section as in FIG. 6.

FIG. 18 illustrates a cross-sectional view of another embodiment that illustrates the same cross-section as in FIG. 6. Referring to FIG. 18, the cover window in the illustrated embodiment is the same as the embodiment of FIG. 6, except that the first upper layer 410 disposed on an upper surface of the glass substrate 310 is further included. A detailed description of the same constituent elements will be omitted. In an embodiment, the first upper layer 410 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the first upper layer 410 may be about 50 Å to about 400 Å, for example.

Figure 19:
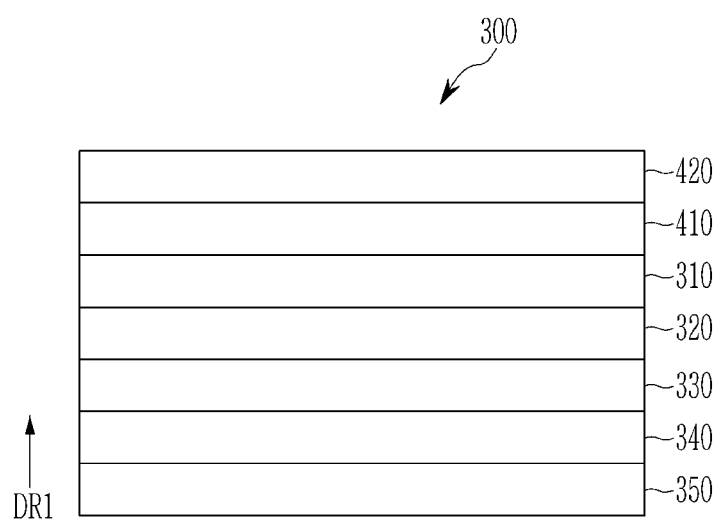
FIG. 19 illustrates a cross-sectional view of another embodiment that illustrates the same cross-section as in FIG. 18.

FIG. 19 illustrates a cross-sectional view of another embodiment that illustrates the same cross-section as in FIG. 18. Referring to FIG. 19, the display device in the illustrated embodiment is the same as the embodiment of FIG. 18, except that the second upper layer 420 disposed on the first upper layer 410 is further included. A detailed description of the same constituent elements will be omitted. In an embodiment, the second upper layer 420 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the second upper layer 420 may be about 50 Å to about 400 Å, for example.

Figure 20:
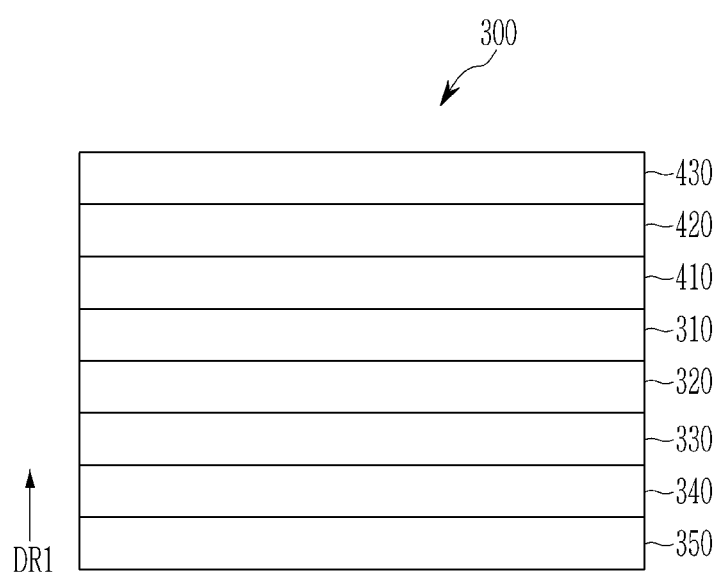
FIG. 20 illustrates a cross-sectional view of another embodiment that illustrates the same cross-section as in FIG. 19.

FIG. 20 illustrates a cross-sectional view of another embodiment that illustrates the same cross-section as in FIG. 19. Referring to FIG. 20, the display device in the illustrated embodiment is the same as the embodiment of FIG. 19, except that the third upper layer 430 disposed on the second upper layer 420 is further included. A detailed description of the same constituent elements will be omitted. In an embodiment, the third upper layer 430 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the third upper layer 430 may be about 50 Å to about 400 Å, for example.

Figure 21:
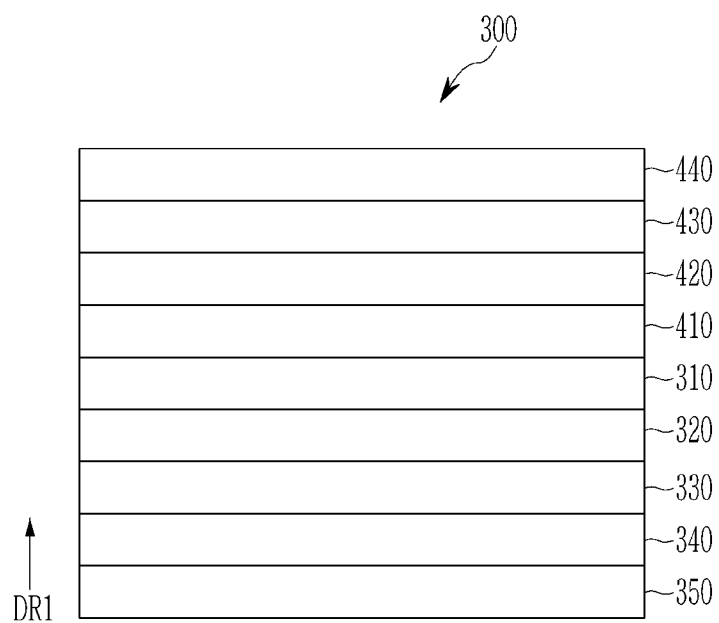
FIG. 21 illustrates a cross-sectional view of another embodiment that illustrates the same cross-section as in FIG. 20.

FIG. 21 illustrates a cross-sectional view of another embodiment that illustrates the same cross-section as in FIG. 20. Referring to FIG. 21, the display device in the illustrated embodiment is the same as the embodiment of FIG. 20, except that the fourth upper layer 440 disposed on the third upper layer 430 is further included. A detailed description of the same constituent elements will be omitted. In an embodiment, the fourth upper layer 440 may include one or more of a polyimine oligomer having an average molecular weight ranging from about 300 g/mol to about 5000 g/mol, an epoxy oligomer having an average molecular weight ranging from about 300 g/mol to about 5000 g/mol, an epoxy silane, an amino silane, a sodium silicate, and a PVA, for example. In an embodiment, a thickness of the fourth upper layer 440 may be about 50 Å to about 400 Å, for example.

Hereinafter, an effect of the cover window of the embodiment of the invention will be described in detail with reference to the drawings and Table 1.

Referring to Table 1, a pen free-drop experiment was performed for the glass substrate having a thickness of 30 μm while varying the materials of the first and second coating layers. After the experiment, when the pen freely dropped, the maximum free drop height at which the cover window could withstand without being broken was measured and is illustrated in FIG. 22.

TABLE 1

|  | Example 1 | Example 2 | Example 3 | Example 4 | Example 5 | Example 6 | Example 7 | Example 8 |
| --- | --- | --- | --- | --- | --- | --- | --- | --- |
| Glass substrate | 30 μm | 30 μm | 30 μm | 30 μm | 30 μm | 30 μm | 30 μm | 30 μm |
| First coating layer | X | Epoxy silane 400 Å | Epoxy silane 400 Å | Epoxy silane 400 Å | Epoxy silane 400 Å | Sodium silicate 400 Å | Sodium silicate 400 Å | Sodium silicate 400 Å |
| Second coating layer | X | X | PVA 400 Å | PVA 400 Å | PVA 400 Å | Polyimine oligomer 400 Å | Polyimine oligomer 400 Å | Polyimine oligomer 400 Å |

Figure 22:
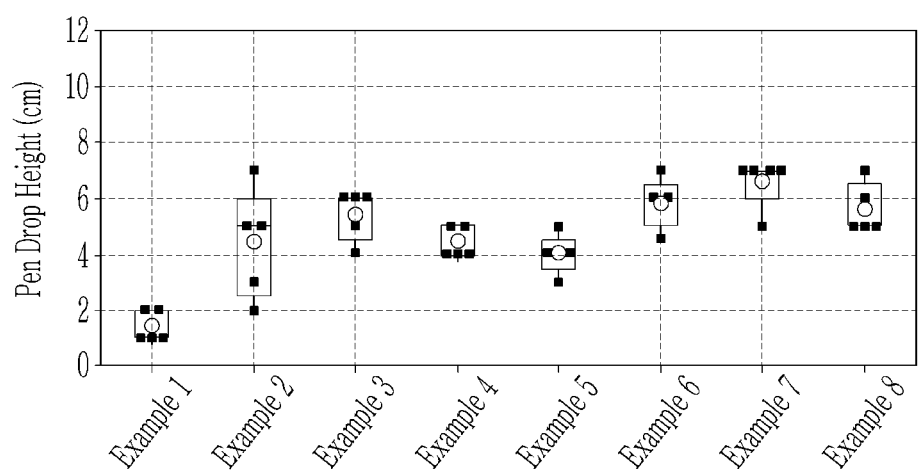
FIG. 22 illustrates a maximum free drop height for each embodiment that a cover window may withstand without breaking after a pen free-drop experiment.

Referring to Table 1 and FIG. 22 together, it was confirmed that Example 1, which includes only the glass substrate and does not include the coating layer, has a significantly lower free drop height compared to examples including the coating layer. That is, when the coating layer was included, it was confirmed that the impact resistance of the cover window increased.

In addition, when comparing Example 2 including only one coating layer and Examples 3 to 8 including two or more coating layers, it was confirmed that the examples including two or more coating layers had a more remarkable effect. That is, in Example 2, the maximum free drop height was low and the deviation was large, whereas in Examples 3 to 8, it was confirmed that the maximum free drop heights were increased and the deviations according to the repeated experiments were decreased.

That is, it was confirmed that the impact resistance increases when two or more coating layers were stacked on the glass substrate as in the illustrated embodiment.

Figure 23:
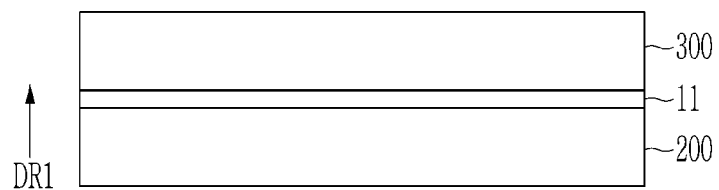
FIG. 23 schematically illustrates a cross-sectional view of an embodiment of a display device according to the invention.

Hereinafter, a display device in an embodiment of the invention will be described with reference to the accompanying drawings. FIG. 23 schematically illustrates a cross-sectional view of an embodiment of a display device according to the invention.

Referring to FIG. 23, the display device in the illustrated embodiment may include a display panel 200 and a cover window 300. The display panel 200 and the cover window 300 may be adhered by an adhesive layer 11.

The display panel 200 may be a liquid crystal display panel including a liquid crystal layer or a light emitting display panel including a light emitting diode. The display panel 200 may include a substrate, a transistor disposed on the substrate, a first electrode connected to the transistor, and a second electrode overlapping the first electrode. In some embodiments, a liquid crystal layer may be disposed between the first electrode and the second electrode. In an alternative embodiment, a light emitting layer may be disposed between the first electrode and the second electrode. The substrate of the display panel 200 is flexible, thus it may be bent.

The cover window 300 may be one of the above-described embodiments. That is, the cover window 300 of FIG. 24 may be one of the cover windows 300 of FIG. 1 and FIGS. 3 to 21.

As described above, the display device including one of the cover windows 300 of FIG. 1 and FIGS. 3 to 21 may be bent and have excellent impact resistance.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the inventive concept.

What is claimed is:

1. A cover window comprising:
a glass substrate;
a first coating layer disposed on a first surface of the glass substrate; and
a second coating layer disposed on the first coating layer,
wherein a thickness of the glass substrate is equal to or less than 30 micrometers, and
a thickness of each of the first coating layer and the second coating layer ranges from 50 angstroms to 400 angstroms,
wherein
the first coating layer includes a sodium silicate or an epoxy silane,
and the second coating layer includes a polyimine oligomer having an average molecular weight ranging from 300 grams per mole to 5000 grams per mole or a polyvinyl alcohol.

2. The cover window of claim 1, wherein
the first coating layer and the second coating layer respectively include materials different from each other.

3. The cover window of claim 1, wherein
each of the first coating layer and the second coating layer includes at least one of a polyimine oligomer having an average molecular weight ranging from 300 grams per mole to 5000 grams per mole, an epoxy oligomer having an average molecular weight ranging from 300 grams per mole to 5000 grams per mole, an epoxy silane, an amino silane, a sodium silicate, and a polyvinyl alcohol.

4. The cover window of claim 1, further comprising
an inorganic film disposed between the first coating layer and the second coating layer.

5. The cover window of claim 1, further comprising
a first upper layer disposed on a second surface of the glass substrate.

6. The cover window of claim 5, further comprising
a second upper layer disposed on the first upper layer,
wherein the first upper layer is disposed between the glass substrate and the second upper layer.

7. The cover window of claim 6, further comprising
a third upper layer disposed on the second upper layer, or
a third upper layer disposed on the second upper layer and a fourth upper layer disposed on the third upper layer.

8. The cover window of claim 1, further comprising
a third coating layer disposed in contact with the second coating layer.

9. A cover window comprising:
a glass substrate;
a first coating layer disposed on a first surface of the glass substrate;
a second coating layer disposed on the first coating layer, and
a third coating layer disposed in contact with the second coating layer,
wherein a thickness of the glass substrate is equal to or less than 30 micrometers,
a thickness of each of the first coating layer and the second coating layer ranges from 50 angstroms to 400 angstroms,
the first to third coating layers respectively include materials different from one another, and
each of the first to third coating layers includes at least one of a polyimine oligomer having an average molecular weight ranging from 300 grams per mole to 5000 grams per mole, an epoxy oligomer having an average molecular weight ranging from 300 grams per mole to 5000 grams per mole, an epoxy silane, an amino silane, a sodium silicate, and a polyvinyl alcohol.

10. The cover window of claim 9, wherein
the first coating layer includes an epoxy silane,
the second coating layer includes a polyvinyl alcohol, and
the third coating layer includes a sodium silicate.

11. The cover window of claim 10, further comprising
a first upper layer disposed on a second surface of the glass substrate.

12. The cover window of claim 11, further comprising
a second upper layer disposed on the first upper layer,
wherein the first upper layer is disposed between the glass substrate and the second upper layer.

13. The cover window of claim 12, further comprising
a third upper layer disposed on the second upper layer, or
a third upper layer disposed on the second upper layer and a fourth upper layer disposed on the third upper layer.

14. The cover window of claim 9, further comprising
a fourth coating layer disposed in contact with the third coating layer.

15. A cover window comprising:
a glass substrate;
a first coating layer disposed on a first surface of the glass substrate;
a second coating layer disposed on the first coating layer,
a third coating layer disposed in contact with the second coating layer, and a fourth coating layer disposed in contact with the third coating layer, wherein a thickness of the glass substrate is equal to or less than 30 micrometers, a thickness of each of the first coating layer and the second coating layer ranges from 50 angstroms to 400 angstroms, wherein the first to fourth coating layers respectively include materials different from one another, and each of the first to fourth coating layers includes at least one of a polyimine oligomer having an average molecular weight ranging from 300 grams per mole to 5000 grams per mole, an epoxy oligomer having an average molecular weight ranging from 300 grams per mole to 5000 grams per mole, an epoxy silane, an amino silane, a sodium silicate, and a polyvinyl alcohol.

16. The cover window of claim 15, wherein the first coating layer includes an epoxy silane, the second coating layer includes a polyvinyl alcohol, the third coating layer includes a sodium silicate, and the fourth coating layer includes a polyimine oligomer having an average molecular weight ranging from 300 grams per mole to 5000 grams per mole.

17. The cover window of claim 15, further comprising an upper layer disposed on a second surface of the glass substrate.

18. A display device comprising:

the cover window of claim 1; and a display panel overlapping the cover window.

* * * * *